May 20, 1930.  E. L. McINTYRE  1,759,585
BRAKE
Filed Jan. 18, 1924
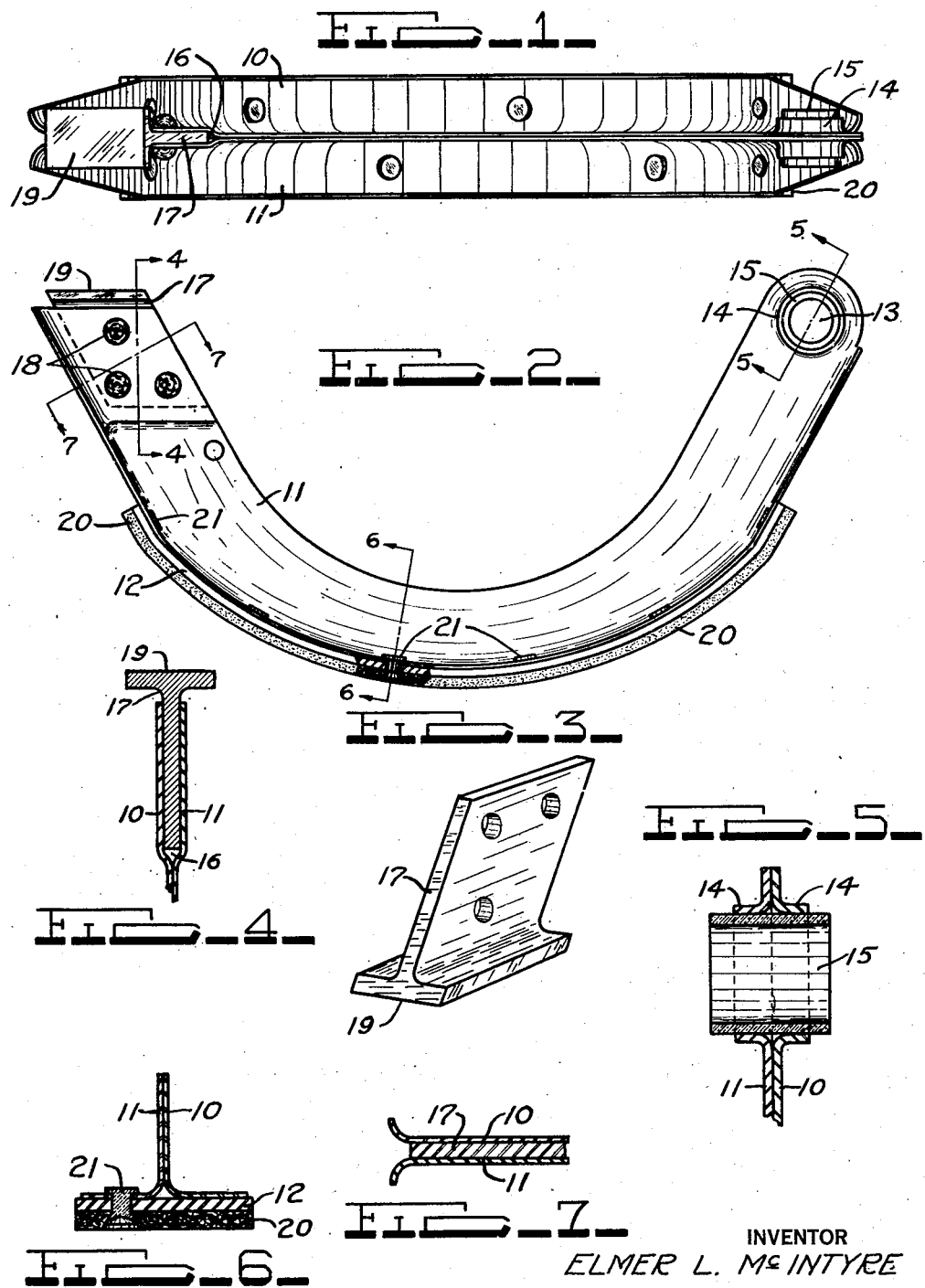
INVENTOR
ELMER L. McINTYRE
BY
P. N. Pomeroy
ATTORNEY Patented May 20, 1930

1,759,585

UNITED STATES PATENT OFFICE

ELMER LLOYD McINTYRE, OF DETROIT, MICHIGAN, ASSIGNOR TO THE STUDEBAKER CORPORATION, OF SOUTH BEND, INDIANA, A CORPORATION OF NEW JERSEY

BRAKE

Application filed January 18, 1924. Serial No. 687,105.

This invention relates to brakes and more particularly to the brake shoes in connection therewith, the principal object being to provide a brake shoe that will be light, strong and durable.

Another object is to provide a brake shoe constructed primarily of metal stampings.

Still another object is to provide a pressed metal brake shoe having a separate hardened cam contact face.

A further object is to provide a pressed metal brake shoe having a bearing of novel construction for receiving the pin upon which it pivots.

A still further object is to provide a pressed metal brake shoe formed mainly from two angle sectional members secured back to back and having a flat friction material receiving member secured across their free face portions.

These being among the objects of the present invention, the same consists of certain features of construction and combination of parts to be hereinafter described and then claimed with reference to the accompanying drawings, which illustrate a suitable embodiment of the invention having the above and other objects in view.

In the drawings:—

Figure 1 is a plan view of a brake shoe incorporating the present invention.

Figure 2 is a side elevation of the brake shoe shown in Figure 1.

Figure 3 is a perspective view of the hardened cam contact member which is shown incorporated in the brake shoe of Figures 1 and 2.

Figure 4 is a transverse section taken on the line 4—4 of Figure 2, showing the cam contact member mounted in the recess formed in the abutting faces of the brake shoe.

Figure 5 is a transverse section taken on the line 5—5 of Figure 2, showing the means for mounting the bushing to carry the pivot pin.

Figure 6 is a transverse section taken on the line 6—6 of Figure 2, showing the reinforcing member and friction material secured to the angle members of the shoe.

Figure 7 is a transverse section taken on the line 7—7 of Figure 2.

Like numerals refer to like parts throughout the different views, and the sectional views are taken looking in the direction of the arrows of the ends of the section lines.

The shoe is constructed as follows:—

Two angle or L-shaped members 10 and 11 are bent so that a substantial portion of one face of each between the ends conforms to the surface of a cylinder, the ends themselves being flattened to the form of a chord of a circle for a purpose to be afterwards described. These members are adapted to be secured together, back to back, with the cylindrical and chord faces flush with each other, and secured together in that position by welding, riveting, or the like, with a flat member 12 secured thereto by any suitable means, and conforming with the cylindrical and chord surfaces of the members as best shown in Figures 2 and 6. The members 10 and 11 are formed independently or separately from each other and are then secured together by welding, or otherwise, to provide a brake shoe having the radially extending webs thereof in back-to-back contact for a greater portion of their lengths, as is clearly shown in the drawings.

Before securing the members 10 and 11 together, an opening 13 is formed in an end of each member 10 and 11, the opening 13 in each member being adapted to match with the other opening when in assembled position and each opening 13 is provided with oppositely extending flared or tubular walls 14, which are formed in the operation of forming the holes 13 by drawing out the metal displaced, this construction being best shown in Figures 1 and 5. When in assembled position a bushing 15 is pressed into the opening as shown in Figure 5 and forms a bearing for a pin (not shown) upon which the shoe is adapted to pivot.

Before assembling the members 10 and 11, the metal at the end opposite the opening 13 is bent back out of flush with, or away from, the contacting face so that when the members 10 and 11 are properly assembled, a recess or slot 16 is formed at and by the end portions. A hardened metal member 17 of T-shaped section is inserted in the recess 16 and secured therein by rivets 18 or other suitable means. The member 17 has a flat face 19 which is adapted to contact against a cam (not shown) which is operated to expand the shoe against a brake drum (not shown).

A strip of friction material 20 is secured to the face of the shoe by rivets 21 and is adapted to engage the aforementioned drum to exert a braking effect. The ends of the strip 20 are brought past the cylindrical portion of the face of the shoe and up onto the flat or chord portion where the ends are secured. The object of providing the flat or chord portions is to prevent the extreme ends of the friction strip 20 from contacting with the drum, which contact would, if allowed, make it much more easy to tear the strip 20 from the shoe in exerting a severe braking effect.

The reinforcing strip 12 is likewise brought around the cylindrical part of the shoe and up onto the flat portion at the ends where it terminates. From this point to the extremities of the shoe the width of the members 10 and 11 gradually decreases as plainly shown in Figure 1, although it is to be understood that this is unnecessary as far as the proper working of my invention is concerned but is merely shown as a preferable construction.

It will be readily seen that the above described invention provides for a light, strong and durable brake shoe, that is economical to make and use and is efficient in operation.

Although I have shown in the drawings and described a specific construction, it is to be understood that this is merely for the purpose of illustration and that formal changes may be made in the specific embodiment described without departing from the spirit or substance of the broad invention, the scope of which is commensurate with the appended claims.

What I claim is:—

1. A pressed metal brake shoe having a recess therein at one end for the reception and retention of a cam contact member.

2. A brake shoe comprising an angle-shaped pressed metal member and a hardened cam contact member secured to one end thereof.

3. A pressed metal brake shoe having a cam contact member secured to one end thereof and an inserted journal bushing at the other end thereof.

4. A brake shoe comprising two pressed metal members of L-shaped section secured back to back, the material of each back at one end of said shoe being formed out of flush with the plane of said back to form a recess between said backs when said members are secured together in operative position, a T-shaped cam contact member having one leg thereof inserted in said recess, a reinforcing member secured to the free legs of said L-shaped sections, friction material secured to said reinforcing member, and a bushing secured in said L-shaped sections adjacent the end opposite the cam contact member.

5. A brake shoe comprising two angular sectional members secured back to back, the material of each back at one end of said shoe being formed out of flush with the plane of said back to form a recess between said backs when said members are secured together in operative relation.

6. A brake shoe comprising two L-sectioned members, a portion of the corresponding face of each member lying in cylindrical surface, and the other faces of which are secured together for the greater part of their length, the last-mentioned faces being bent away from each other at one end to allow a cam contact member to be inserted and secured therebetween.

7. A brake shoe comprising two metallic members, a face of one contacting with and being secured to a corresponding face of the other, an opening in each of said contacting faces having tubular walls drawn out of the metal and extending away from the plane of contact of said members, and a bushing inserted in said openings.

8. A brake shoe comprising two metallic members of angle section in which a leg of one member contacts with and is secured to a corresponding leg of the other member, the free legs being flush with each other and being formed to the shape of a cylindrical surface, each of the first mentioned legs having an opening therein matching with the opening in the other and the walls of said openings being drawn out into the shape of a tube and away from the plane of contact of said members, and a bushing secured in said openings.

9. A brake shoe comprising two pressed metal members of L-shaped section secured back to back, the free extending portions being flush with each other and being formed intermediate their ends to conform to the shape of a cylindrical surface, the end portions being formed to the shape of a chord of a circle, a flat reinforcing member secured to and extending over said circular portion, the contacting faces of said L-shaped members being spread at one end to receive a cam contact member therebetween and being provided at the other end with matched openings, the walls of which are tubular and extending away from the plane of contact of said members, a bushing in said openings, and friction material secured to the circular face of said shoe.

10. A pressed brake shoe having a pair of parts arranged substantially in radial planes and formed with alined openings, the metal about the openings being drawn in opposite directions to form coaxial sleeves.

11. A brake shoe formed of two connected parts engaging each other along the central plane of the shoe and a brake lining secured to both of said parts and bridging across them.

12. A brake shoe comprising a pair of angle-shaped pressed metal members and a hardened cam contact member secured to one end of said members.

13. A brake shoe, comprising two independent angular sections secured back to back.

14. A brake shoe, comprising two independent angular sections secured with their backs in direct contact.

15. A brake shoe, comprising two separate pressed metal angular sections secured back to back.

16. A brake shoe, comprising two separate pressed metal angular sections secured back to back, and a separate reinforcing member secured across the free faces of said angular sections.

17. A brake shoe, comprising two separate substantially semi-circular pressed metal members of L-shaped section secured back to back.

18. A brake shoe, comprising two separate substantially semi-circular pressed metal members of L-shaped section secured back to back, and a reinforcing strip conforming with and secured to the free faces thereof.

19. A brake shoe, comprising two separate substantially semi-circular angular members of pressed metal, means for securing said independent sections together, and a reinforcing member secured to and extending over the cylindrical surfaces thereof.

20. A brake shoe, comprising two separate stamped metal parts of L-shaped section, means for securing the radial portions of said parts together, and a reinforcing member secured to and conforming in shape to the outer faces of said parts.

21. A brake shoe the main portion of which is formed from two separate sheet metal stampings, each stamping comprising a flat portion provided with a marginal flange perpendicular thereto and forming a part of a cylindrical surface, the flat portions of said stamping being secured together in contacting relation to form a T-sectioned body.

22. A brake shoe comprising two separate angular shaped pressed metal members a corresponding portion of each being secured together, and another portion of each being disposed perpendicularly to the first mentioned portion in the path of a circle and extending away from each other.

23. A brake shoe of T-shaped section formed by securing two separate metal stampings together, each stamping comprising a single sheet of metal a margin of which is bent perpendicularly thereto to simulate a portion of a cylindrical surface.

24. A brake shoe comprising in combination pressed metal parts arranged to form a circumferential lining supporting surface and radial flanges, said radial flanges being co-extensive and projecting beyond the circumferential surface to form anchoring extensions at one end of the shoe, and means in said extensions for anchoring the shoe.

25. A brake shoe made of pressed metal parts, each having a radial reinforcing flange and a circumferential lining supporting surface, the flanges at one end of the shoe extending beyond the lining supporting surface and having therein aligned openings for anchoring the shoe.

26. A pressed metal shoe having a cylindrical lining supporting part, radial flanges therefor, said radial flanges being coextensive and extending substantially beyond the end of the cylindrical lining supporting part, means therein for supporting and anchoring the shoe.

27. A T-shaped sheet metal shoe having co-extensive anchoring extensions projecting from one end thereof, anchoring means for the shoe near the ends of said extensions, and said shoe having a contact member at the opposite end thereof.

28. A sheet metal shoe having a cylindrical lining supporting part and a radial reinforcing flange therefor, said flange having an outwardly projecting integral extension near one end thereof for anchoring the shoe.

29. A sheet metal shoe having a lining supporting cylindrical part and a radial reinforcing flange, said flange having an integral sleeve projecting therefrom near one end and a contact member rigidly secured to the opposite end of said flange.

Signed by me at Detroit, Michigan, U. S. A., this 14th day of January, 1924.

ELMER LLOYD McINTYRE.